UNITED STATES PATENT OFFICE.

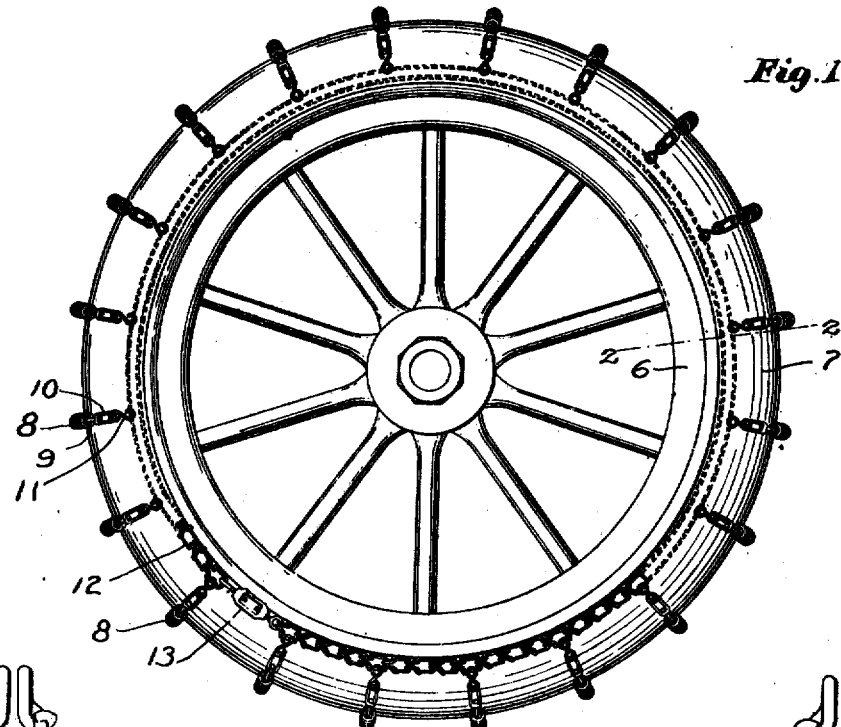
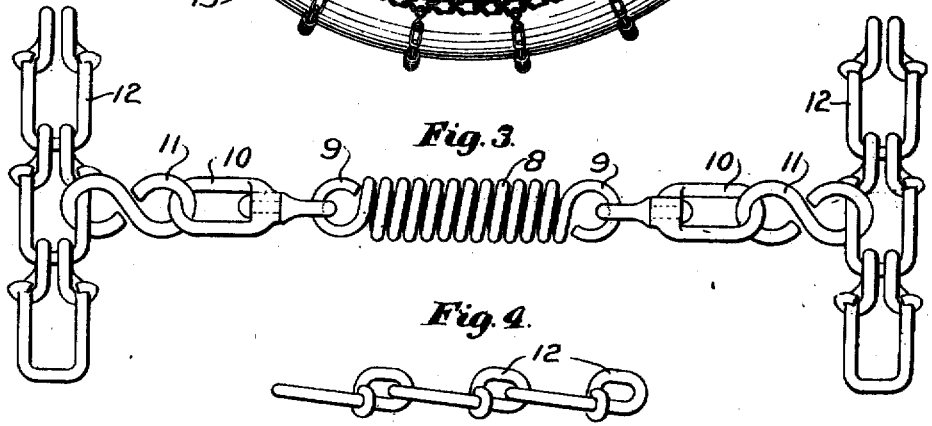
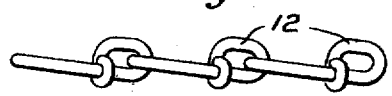
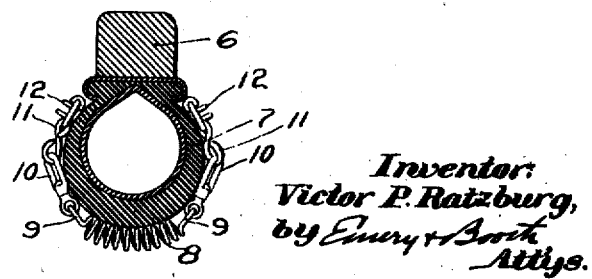

VICTOR P. RATZBURG, OF NASHUA, NEW HAMPSHIRE, ASSIGNOR, BY MESNE ASSIGNMENTS, TO BARRELL HOLDING AND MANUFACTURING COMPANY, OF PORTLAND, MAINE, A CORPORATION OF MAINE.

ARMOR FOR VEHICLE-TIRES.

1,338,842.  Specification of Letters Patent.  Patented May 4, 1920.

Application filed October 21, 1907. Serial No. 398,323. Renewed November 12, 1917. Serial No. 201,660.

*To all whom it may concern:*

Be it known that I, VICTOR P. RATZBURG, a citizen of the United States, and a resident of Nashua, in the county of Hillsborough and State of New Hampshire, have invented an Improvement in Armor for Vehicle-Tires, of which the following description, in connection with the accompanying drawings, is a specification, like letters on the drawings representing like parts.

This invention relates to armor for vehicle tires which may serve as reinforcement against wear, or as a preventive of skidding, or both.

Tire armor is subjected to destructive abrasion, which soon wears away any parts presented continuously at the tread of the armor. For example, in some chain armors heretofore used those parts of the links which impacted against the road were rapidly demolished, requiring that the armor be discarded even though other parts of the same links may have remained unworn. It has been proposed to overcome this difficulty and to prolong the utility of armor by making the tread members reversible, to permit one side, when worn, to be replaced by a diametrically opposite side.

It is an object of this invention to provide tire armor conveniently adjustable while on the tire to present different parts at the tread of the armor to receive wear; and thereby to avoid the necessity of removing the armor in the manner suggested. Also, armor embodying the invention may be progressively adjustable to present successive peripheral portions of tread members at the tread of the armor so that wear shall be distributed equally over the entire surface of the armor; and if desired the adjustment referred to may be effected automatically in the use of the armor.

It is also an object of the invention to provide tread members, which shall not only be capable of adjustment to continually present different parts of the wearing surface to the road, but to provide for a resilient action of the tread members, by reason of which the latter shall be adaptable to changes in formation of the tire. Thus the tread members serve to contribute to the resiliency of the general structure, as well as possessing the characteristic of presenting shifting wearing surfaces. Another object is to provide tread members whose elasticity shall possess the advantage of causing the tread structure to cling snugly to the tire, and prevent rattling and slatting of the armor.

The character of the invention may be best understood by reference to the accompanying drawings, which show for purposes of illustration a construction embodying the features of the invention.

In the drawings:

Figure 1 is a side elevation of a wheel and tire associated with an illustrative form of armor;

Fig. 2, a transverse radial section of the wheel on the line 2—2 of Fig. 1;

Fig. 3, an enlarged detail showing a practicable form of tread guard which may comprise a part of the armor shown in Figs. 1 and 2; and, Fig. 4, an enlarged detail of a holding structure of convenient but non-essential form, which may be employed to secure in place tread guards such as illustrated in Fig. 3.

Referring to Fig. 1, the invention will be described as applied to a vehicle wheel 6, having a pneumatic tire 7. Extending transversely of the tire 7 is a plurality of tread members 8, shown enlarged in Fig. 3. As illustrated in Fig. 3, the immediate tread portion of the tread member 8 is supplied by a coil spring, and this construction presents many advantages by reason of the resiliency of the spring and its adaptability to changes in the conformation of the tire. It is not essential, however, that the tread be supplied by a coil spring, since any practicable substitute may be employed. In the specific illustration the spring 8 has eyes 9, 9 by which its extremities are connected to swivels 10, 10, or equivalent devices, arranged to permit the spring 8 or its substitute to be turned or adjusted to present a new wearing surface at the tread of the armor. Any practicable number of tread members may be held in proper position on the tire by any suitable means as, for example, by having the swivels 10 connected by S-links 11, respectively, to holding members 12, the latter extending around opposite sides of the wheel as shown in Fig. 1, and having their ends connected by turnbuckles 13. The holding members 12 may be of any practicable form or material. As specifically illustrated, each holding member 12 consists of a chain, having hook links as shown in side elevation in Fig. 4. This form of chain is particularly desirable since it has a substantially flat side which will lie snugly against the tire or rim of the wheel.

In using the exemplary embodiment of the invention shown in the drawings the armor may be applied either before or after inflating the tire and it may be tightened conveniently by means of the turnbuckles 13. If springs 8 are employed as tread members and the turnbuckles 13 are turned sufficiently, the entire armor will be placed under tension and held snugly in place so as to avoid the objectionable rattling experienced in the use of armor composed entirely of chains or the like. When springs are used as part of the armor, the normal tension or elasticity thereof may serve to reduce the tendency to free movement of the armor on the tire, it being understood, however, that it is desirable that the armor shall not be positively anchored to the wheel, but shall be permitted to move circumferentially to a slight extent, and the tread members shall be permitted to roll along the tread of the tire at least to some extent. The turnbuckles, of course, may be used to distend the springs to such an extent that parts of the armor will be more or less embedded in the tire, so as to at least obstruct movement of the armor on the tire.

With the specific construction disclosed every time one of the spring tread members 8 strikes the ground it may be slightly rotated about its own axis, so as to present for its next impact a new wearing surface. Thus, every portion of the exterior of the spring may be subjected to wear which, as regards the entire spring, will therefore be very gradual.

Various advantages other than those particularly pointed out will be apparent to those familiar with the art, as will also appear the fact that the exemplary construction hereinbefore described in detail may be variously changed and modified without departing from the proper scope of the invention. It is to be understood that no attempt has been made hereinbefore to define the exact scope of the invention, that office being delegated exclusively to the subjoined claims.

Claims.

1. An anti-skidding device for vehicle tires comprising, in combination, annular side holding means to be disposed at opposite sides of the wheel; and individual rotatable tread members connected to the side holding means; the whole adapted to be supported on the tire and to be retained thereon independently of positive attachment.

2. An anti-skidding device for vehicle tires, comprising in combination, annular side holding chains to be disposed at opposite sides of a wheel, individual rotatable tread members, and swivels connecting said individual rotatable tread members to the side holding chains, the whole adapted to be supported on the tire and to be retained thereon independent of positive attachment.

3. An anti-skidding device for vehicle tires comprising, in combination, annular side holding chains disposed at opposite sides of the wheel, and coil springs swiveled to the side chains, the whole supported on the tire, and retained thereon independently of positive attachment.

4. An anti-skidding device for vehicle tires comprising, in combination, annular side holding members disposed on opposite sides of the wheel, and substantially cylindrical individual rotatable resilient tread members connected to the side members, the whole supported on the tire and retained thereon independently of positive attachment.

5. An anti-skidding device for vehicle tires comprising, in combination, substantially cylindrical freely rotatable resilient tread members, and means to retain them upon the tread of a tire while permitting them to shift circumferentially about the tire, and by their engagement therewith to rotate about their own axis, and to revolve about the axis of the tire.

6. An anti-skidding device for vehicle tires comprising, in combination, tread members extending transversely of the tire, holding means for said members at the sides of the tire, and connections between said means and said members to permit the rotation of said members, said members constituted by a series of independently spreadable road engaging elements.

7. An anti-skidding device for vehicle tires comprising, in combination, a substantially cylindrical resilient metallic member disposed on the tread of a wheel, swivels having two rotatable parts one of which is flexibly connected to said member, said parts being adapted and arranged to permit said member to rotate on its longitudinal axis, and holding means to which said swivels are connected, said holding means being free from positive attachment to the tire, whereby said member is permitted to roll along the tread surface of the tire and the whole device is permitted automatically to shift circumferentially.

8. The combination of a vehicle wheel; side holding members at opposite sides of the wheel; and freely rotatable resilient tread members supported in position by the side members independently of the wheel.

9. A vehicle wheel having a tire, in combination with an anti-skidding device comprising a number of flexible cross members extending across said tire spaced at intervals around the periphery thereof, each of said cross members comprising a roller having a plurality of blunt edged circumferential projections adapted to be gripped between the tire and the ground, each cross member also comprising means for allowing the roller to rotate relatively to the tire, and means for holding said cross members on the wheel while permitting them to shift circumferentially about the tire, and by their engagement therewith to rotate about their own axis, and to revolve about the axis of the tire.

10. A vehicle wheel having a tire, in combination with an anti-skidding device comprising a number of flexible cross members extending across said tire at intervals around the periphery thereof, each of said cross members comprising a roller having a plurality of blunt edged circumferential projections adapted to be gripped between the tire and the ground, each cross member also comprising means for allowing the roller to rotate relatively to the tire, and supporting means for holding said cross members on the wheel, said supporting means extending around the wheel at each side thereof but free from direct attachment to the wheel.

11. A traction attachment for vehicle wheels comprising a series of rotatably mounted gripping devices arranged transversely over the surface of the wheel tire, and means for holding said gripping devices in place merely by the engagement of the traction attachment with the tire, and permitting the gripping devices to roll along the tread surface of the tire and the traction attachment to move circumferentially.

12. Tire armor comprising, in combination, a tread member arranged to extend across the tread surface of the tire, and holding provision to position the same on the tire while permitting the armor to shift circumferentially about the tire, all parts of the holding provision being remote from the tread surface of the tread member, and the tread member being mounted to rotate freely with relation to the holding provision automatically to present different wearing surfaces when in use and to roll along the tread surface of the tire.

13. An anti-skidding device for vehicle wheels comprising a series of tread members extending transversely of the tire each constituted by a plurality of coil elements connected to retractively resist separation and yieldable to conform to a tire under use, holding means to be located at the sides of the wheel, and connections between said holding means and said tread members to permit limited longitudinal and radial movement of said members and to facilitate rotative movement thereof.

In testimony whereof, I have signed my name to this specification, in the presence of two subscribing witnesses.

VICTOR P. RATZBURG.

Witnesses:
CLAUD GRAVES,
FRANK N. JACQUES.